United States Patent
Cho et al.

(10) Patent No.: US 9,892,090 B2
(45) Date of Patent: Feb. 13, 2018

(54) IMAGE PROCESSING APPARATUS AND METHOD FOR VECTOR DATA

(71) Applicant: SAMSUNG ELECTRONICS CO., LTD., Suwon-si, Gyeonggi-do (KR)

(72) Inventors: Jung-uk Cho, Hwaseong-si (KR); Young-su Moon, Seoul (KR); Jong-hun Lee, Suwon-si (KR); Yong-min Tai, Yongin-si (KR); Do-hyung Kim, Hwaseong-si (KR); Si-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 469 days.

(21) Appl. No.: 14/525,856

(22) Filed: Oct. 28, 2014

(65) Prior Publication Data
US 2015/0116338 A1    Apr. 30, 2015

(30) Foreign Application Priority Data

Oct. 29, 2013 (KR) .................. 10-2013-0129564

(51) Int. Cl.
| | | |
|---|---|---|
| G06F 15/80 | (2006.01) | |
| G06F 9/38 | (2006.01) | |
| G09G 5/39 | (2006.01) | |
| G09G 5/36 | (2006.01) | |
| G06T 1/60 | (2006.01) | |

(52) U.S. Cl.
CPC ........ G06F 15/8053 (2013.01); G06F 9/3895 (2013.01); G09G 5/363 (2013.01); G09G 5/39 (2013.01); G06T 1/60 (2013.01)

(58) Field of Classification Search
None
See application file for complete search history.

(56) References Cited

U.S. PATENT DOCUMENTS

| | | | | |
|---|---|---|---|---|
| 5,528,302 A | * | 6/1996 | Basoglu | G06T 11/203 348/163 |
| 6,011,581 A | * | 1/2000 | Swift | G02B 27/0093 345/419 |
| 6,088,783 A | * | 7/2000 | Morton | G06F 9/3802 712/203 |
| 6,957,324 B2 | | 10/2005 | Washio | |
| 7,584,343 B2 | | 9/2009 | Kirsch | |

(Continued)

OTHER PUBLICATIONS

Lawrence W. Fritz, James R. Lucas, "Geographic information systems and remote sensing future computing environment—an update", ISPRS Archives—vol. XXIX Part B2, 1992, http://www.isprs.org/proceedings/XXIX/congress/part2/258_XXIX-part2.pdf.*

*Primary Examiner* — Sarah Le
(74) *Attorney, Agent, or Firm* — Staas & Halsey LLP

(57) ABSTRACT

Disclosed are an image processing apparatus and method that more efficiently process image data. The image processing apparatus includes a vector data manager that receives at least some of all image data and converts the received image data into vector data, a vector processor that receives the vector data from the vector data manager, performs a vector processing operation by using the vector data, and generates output vector data as a result of the vector processing operation, and a synchronizer that controls a timing of when the vector data manager transmits the vector data to the vector processor.

14 Claims, 6 Drawing Sheets

(56) References Cited

U.S. PATENT DOCUMENTS

| | | | | |
|---|---|---|---|---|
| 2002/0006270 A1* | 1/2002 | Nitta | .................... | H04N 9/8042 |
| | | | | 386/204 |
| 2002/0085007 A1* | 7/2002 | Nelson | ................ | G06F 15/8053 |
| | | | | 345/505 |
| 2005/0238225 A1* | 10/2005 | Jo | ............................ | H04N 1/58 |
| | | | | 382/162 |
| 2006/0170954 A1* | 8/2006 | Leyvi | ........................ | G06F 3/14 |
| | | | | 358/1.15 |
| 2010/0110089 A1* | 5/2010 | Paltashev | .................. | G06T 1/20 |
| | | | | 345/522 |
| 2013/0101201 A1* | 4/2013 | Holeva | ................ | G06T 7/0085 |
| | | | | 382/141 |

* cited by examiner

IMAGE PROCESSING APPARATUS AND METHOD FOR VECTOR DATA

RELATED APPLICATIONS

This application claims the benefit of Korean Patent Application No. 10-2013-0129564, filed on Oct. 29, 2013, in the Korean Intellectual Property Office, the disclosure of which is incorporated herein in its entirety by reference.

BACKGROUND

1. Field

One or more embodiments relate to an image processing apparatus and method that more efficiently processes image data.

2. Description of the Related Art

Image photographing apparatus, such as cameras, camcorders, etc., are widely distributed to general consumers in addition to expert consumers. Recently, digital image photographing apparatuses have been distributed due to the advance of digital technology. Also, an image captured by a digital image photographing apparatus may have a form of digital image data.

Image data may be variously processed depending on a particular purpose. For example, raw data acquired by a charge-coupled device (CCD) sensor or complementary metal-oxide semiconductor (CMOS) sensor of a digital camera may be processed by different methods depending on the purpose. For example, the raw data may be converted into color image data through processing.

Moreover, image data may be processed for enhancing a quality of an image. For example, noise included in the image may be removed by processing the image data. Also, a sharpness of the image may be enhanced by processing the image data. Also, a color of the image may be corrected by processing the image data. Also, features may be extracted from the image by processing the image data.

Input image data may be processed to thereby generate output image data. Data of one pixel included in an output image may be generated by simultaneously processing data of a plurality of pixels included in input image data. As described above, a number of arithmetic operations may be performed in processing image data. Also, much time is expended in performing the arithmetic operations.

SUMMARY

One or more embodiments include an image processing apparatus and method that more efficiently process image data.

One or more embodiments include an image processing apparatus and method that more quickly process image data.

One or more embodiments include an image processing apparatus and method that process massive amounts of image data in real time.

Additional aspects will be set forth in part in the description which follows and, in part, will be apparent from the description, or may be learned by practice of the presented embodiments.

According to one or more embodiments, an image processing apparatus includes: a vector data manager that receives at least some of all image data, and converts the received image data into vector data; a vector processor that receives the vector data from the vector data manager, performs a vector processing operation by using the vector data, and generates output vector data as a result of the vector processing operation; and a synchronizer that controls a timing of when the vector data manager transmits the vector data to the vector processor.

The vector data manager may receive the output vector data from the vector processor, converts the output vector data into output image data, and outputs the output image data.

The synchronizer may control a timing of when the vector data manager receives the output vector data from the vector processor, and control a timing of when the vector data manager outputs the output image data.

The vector data manager may include: a line memory that receives and stores first pixel row data corresponding to at least one or more continuous pixel rows among all the image data; a kernel memory that receives first pixel kernel data, corresponding to a first pixel kernel including two-dimensionally arranged at least one or more continuous pixels among the first pixel row data, from the line memory, and stores the received first pixel kernel data; and a vector data control unit that converts the first pixel kernel data, stored in the kernel memory, into the vector data, and transmits the vector data to the vector processor.

The synchronizer may include: a signal receiving unit that receives a signal indicating a progress situation of the vector processing operation from the vector processor; and a signal transmitting unit that transmits a synchronization signal to the vector data manager according to the received signal. The vector data control unit may transmit the vector data to the vector processor in response to the synchronization signal, and the first pixel kernel data stored in the kernel memory may be updated with second pixel kernel data corresponding to a second pixel kernel in response to the synchronization signal.

When a column index number of a pixel having a greatest column index number among a plurality of pixels included in the second pixel kernel is the same as a maximum column index number in a whole image corresponding to all the image data, the first pixel row data stored in the line memory may be updated with second pixel row data in response to the synchronization signal.

A column index number of a pixel column included in the second pixel kernel may be greater than a column index number of a pixel column included in the first pixel kernel, and a row index number of a pixel row included in the second pixel kernel may be the same as a row index number of a pixel row included in the first pixel kernel.

The vector data manager may further include: an image data control unit that performs control so that the first pixel row data among all the image data stored in an external memory is stored in the line memory; and a memory control unit that allows the pixel kernel data to be stored in the kernel memory.

Number of the pixel rows corresponding to the first pixel row data may be less than number of pixel rows included in a whole image corresponding to all the image data, and number of pixels included in each of the pixel rows may be the same as number of pixel columns included in the whole image.

Number of pixel rows included in the pixel kernel may be the same as number of the pixel rows corresponding to the first pixel row data stored in the line memory, and number of pixel columns included in the pixel kernel may be less than number of pixel columns included in the whole image corresponding to all the image data.

The vector data may correspond to a pixel vector including at least one or more one-dimensionally arranged pixels.

According to one or more embodiments, an image processing apparatus includes: a first vector data manager that receives at least some of first image data, and converts the received first image data into vector data; a first vector processor that receives the vector data from the first vector data manager, performs a first vector processing operation by using the vector data, and generates first output vector data as a result of the first vector processing operation; a first synchronizer that controls a timing of when the first vector data manager transmits the vector data to the first vector processor; a second vector data manager that receives the first output vector data from the first vector processor; a second vector processor that receives the first output vector data from the second vector data manager, performs a second vector processing operation by using the first output vector data, and generates second output vector data as a result of the second vector processing operation; and a second synchronizer that controls a timing of when the second vector data manager receives the first output vector data from the first vector processor and a timing of when the second vector data manager transmits the first output vector data to the second vector processor.

The second vector data manager may receive the second output vector data from the second vector processor, convert the second output vector data into second image data, and output the second image data. The second synchronizer may control a timing of when the second vector data manager receives the second output vector data from the second vector processor and a timing of when the second vector data manager outputs the second image data.

According to one or more embodiments, an image processing method includes: receiving at least some of all image data; converting the received image data into vector data in response to a synchronization signal; and performing a vector processing operation by using the vector data to generate output vector data.

The image processing method may further include: after the generating of the output vector data, converting the output vector data into output image data; and outputting the output image data.

The converting of the output vector data into output image data may include: converting the output vector data into pixel kernel data corresponding to a pixel kernel including two-dimensionally arranged at least one or more continuous pixels; and storing the pixel kernel data in a line memory. The outputting of the output image data may include outputting the pixel kernel data stored in the line memory.

The converting of the received image data may include: storing pixel row data, corresponding to at least one or more continuous pixel rows among all the image data, in a line memory; storing pixel kernel data, corresponding to a pixel kernel including two-dimensionally arranged at least one or more continuous pixels among the pixel row data, in a kernel memory; and converting the pixel kernel data into the vector data.

According to one or more embodiments a method, includes sampling an image using a image line memory having rows and columns; sampling a pixel kernel of the sampled image using a kernel memory; and processing the pixel kernel as a vector using a vector processor to produce an output pixel. The sampling the pixel kernel is initiated by a synchronization signal indicating completion of the processing to allow the processing with respect to a next kernel to start. The vector may be a two-dimensional data vector and the processing may be two-dimensional vector processing.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
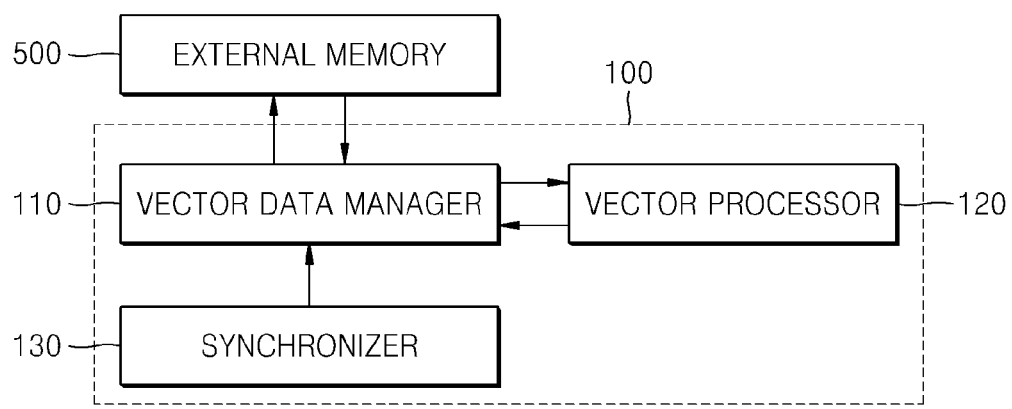
FIG. 1 is a block diagram of a configuration of an image processing apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The advantages, features and aspects of the embodiments will become apparent from the following description of the embodiments with reference to the accompanying drawings, which is set forth hereinafter. The embodiments may, however, be embodied in different forms and should not be construed as limited to the embodiments set forth herein. Rather, these embodiments are provided so that this disclosure will be thorough and complete, and will fully convey the scope of the embodiments to those skilled in the art. Like reference numerals refer to like elements throughout.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

The terms used herein are for the purpose of describing exemplary embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an image processing apparatus 100 and an image processing method according to embodiments will be described in detail with reference to FIGS. 1 to 7.

FIG. 1 is a block diagram of a configuration of an image processing apparatus 100 according to an embodiment. Referring to FIG. 1, the image processing apparatus 100 according to an embodiment may include a vector data manager 110, a vector processor 120, and a synchronizer 130.

The vector data manager 110 may receive image data, and convert the image data into vector data. For example, the vector data manager 110 may receive the image data from the outside or externally. The vector data manager 110 may receive at least some of all image data from an external memory 500. The vector data manager 110 may convert at least some of the received image data into vector data.

All the image data may be generated by an external device. All the image data may be generated from a whole or entire image. The image data may be digital data. For example, an image may be captured by a camera or a camcorder. The image may be converted into image data by the camera, the camcorder, or a conversion device.

All the image data may correspond to a whole or entire two-dimensional (2D) image. The 2D image may include at least one or more pixels. The image data may include pixel data of the pixels.

The whole image may include at least one or more pixel rows and at least one or more pixel columns. One pixel row may include at least one or more pixels. One pixel column may include at least one or more pixels. All the image data may include pixel row data corresponding to the pixel row. Also, all the image data may include pixel column data corresponding to the pixel column.

The whole image may include m (where m>=1) pixel rows. Also, the whole image may include n (where n>=1) pixel columns. A position of each pixel included in the whole image may be defined by using a row index number and a column index number. For example, each pixel may be arranged on an ith (where $1 <= i <= m$) row and a jth (where $1 <= j <= n$) column.

Moreover, the vector data manager 110 may transmit the vector data to the vector processor 120. The vector processor 120 may process the vector data to generate output vector data. The vector data manager 110 may receive the output vector data from the vector processor 120. The vector data manager 110 may convert the output vector data into image data. The vector data manager 110 may transmit the image data to the external memory 500.

Figure 2:
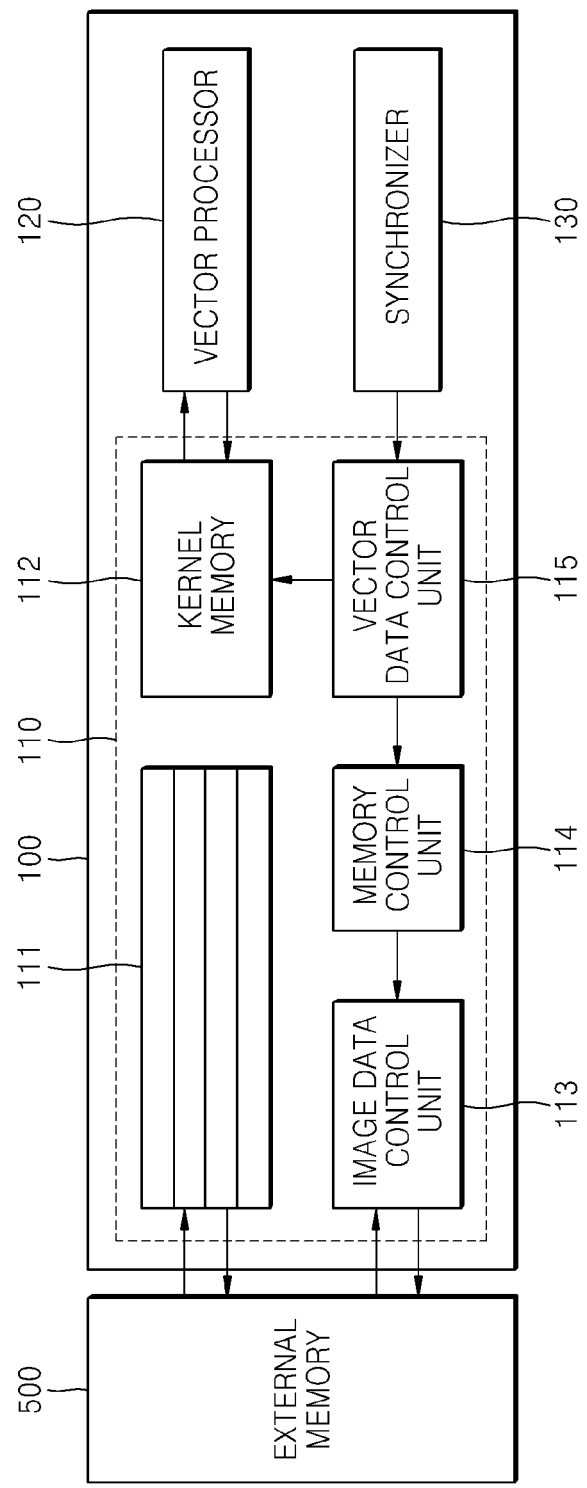
FIG. 2 is a block diagram of a configuration of a vector data manager of the image processing apparatus, according to an embodiment.
Figure 3:
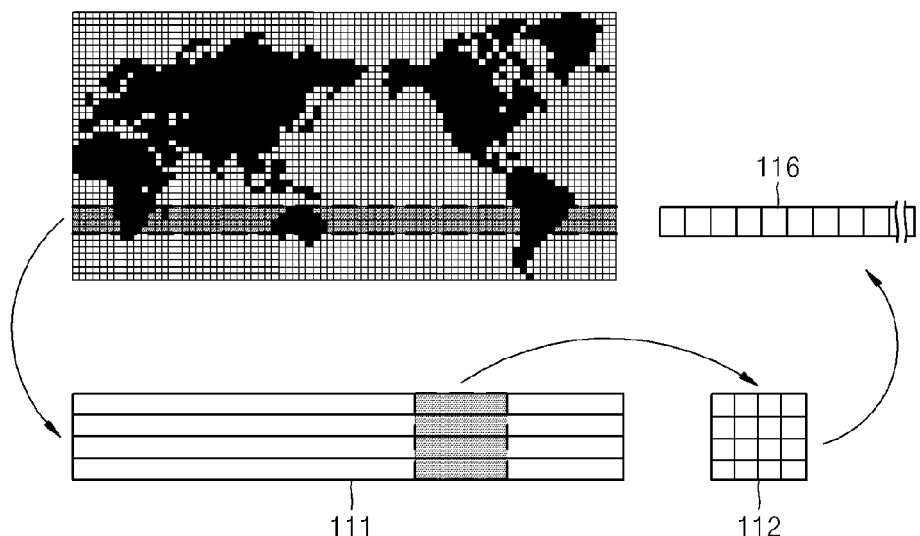
FIG. 3 is a reference diagram for describing an operation of the vector data manager of the image processing apparatus, according to an embodiment.
Figure 4:
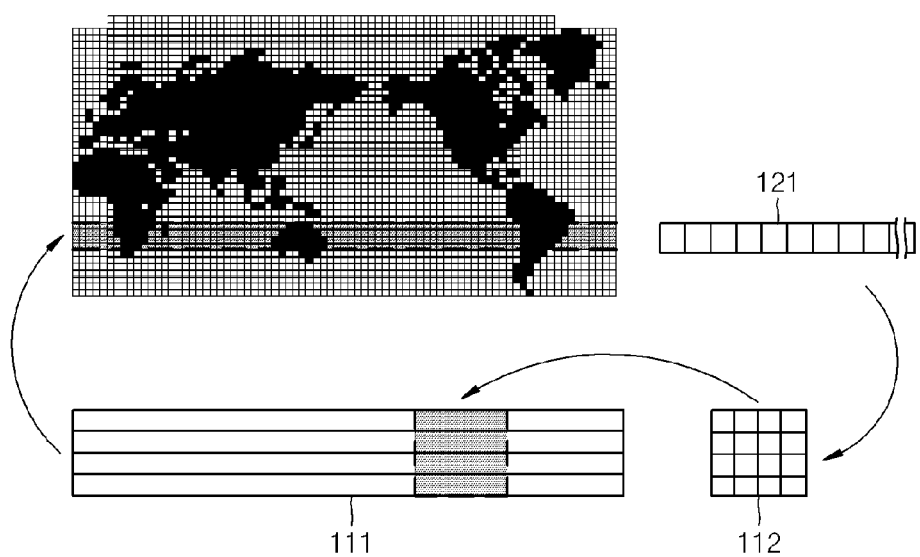
FIG. 4 is a reference diagram for describing the operation of the vector data manager of the image processing apparatus, according to an embodiment.

FIG. 2 is a block diagram of a configuration of the vector data manager 110 of the image processing apparatus 100, according to an embodiment. FIG. 3 is a reference diagram for describing an operation of the vector data manager 110 of the image processing apparatus 100, according to an embodiment. FIG. 4 is a reference diagram for describing the operation of the vector data manager 110 of the image processing apparatus 100, according to an embodiment.

Referring to FIG. 2, the vector data manager 110 may include a line memory 111, a kernel memory 112, an image data control unit 113, a memory control unit 114, and a vector data control unit 115.

Referring to FIG. 3, the line memory 111 may receive and store pixel row data corresponding to at least one or more pixel rows among all image data obtained or sampled from the sample data. The line memory 111 may receive and store pixel row data corresponding to at least one or more continuous pixel rows.

The number of pixel rows, included in an image corresponding to image data stored in the line memory 111, may be less than or equal to the number of pixel rows included in a whole image. The line memory 111 may receive and store p (where $1 <= p <= m$) or positions or rows pieces of pixel row data. The image data stored in the line memory 111 may correspond to p number of continuous pixel rows. The image data stored in the line memory 111 may include pixel row data corresponding to the p continuous pixel rows.

The number of pixel columns, included in the image corresponding to the image data stored in the line memory 111, may be equal to the number of pixel columns included in the whole image. Each pixel row, included in an image corresponding to image data stored in the line memory 111, may include n number of pixels. Therefore, pixel row data corresponding to one pixel row may include pixel data corresponding to the n pixels.

The image data stored in the line memory 111 may include pixel column data corresponding to n number of continuous pixel columns. One pixel column may include p number of pixels. Therefore, pixel column data corresponding to one pixel column may include pixel data corresponding to the p pixels.

The line memory 111 may include at least one or more sub-line memories. For example, the line memory 111 may include p number of sub-line memories. Each of the sub-line memories may store pixel row data corresponding to a corresponding pixel row. The sub-line memories may separately operate.

The image data control unit 113 may allow the pixel row data to be stored in the line memory 111. The image data control unit 113 may exchange a signal with the external memory 500. The image data control unit 113 may perform control so that pieces of pixel row data, corresponding to at least one or more pixel rows among image data stored in the external memory 500, are transmitted to the line memory 111.

The kernel memory 112 may receive pixel kernel data, corresponding to a pixel kernel including at least one or more pixels among the pixel row data, from the line memory 111, and store the received pixel kernel data. The pixel kernel may include at least one or more continuous pixels. The pixel kernel may include at least one or more rectangularly arranged pixels.

The numbers of pixel rows and pixel columns included in a pixel kernel may be predetermined depending on an image data processing method. Image data may be processed by different methods depending on a purpose. For example, image data may be converted into color image data through processing. Also, noise included in the image may be removed by processing the image data. Also, a sharpness of an image may be enhanced by processing the image data. Also, a color of the image may be corrected by processing the image data. Also, features may be extracted from the image by processing the image data.

Input image data may be processed to thereby generate output image data. Pixel data, corresponding to one pixel included in an output image, may be generated by simultaneously processing pixel data corresponding to a plurality of pixels included in an input image. The number of pixels or a position of each of the pixels may be predetermined depending on an image data processing method.

Each of the plurality of pixels may correspond to a pixel included in the pixel kernel. In other words, pixel data corresponding to one pixel included in an output image may be generated by processing the pixel kernel data stored in the kernel memory 112. Also, the number of pixels included in a pixel kernel or a position of each of the pixels may be predetermined depending on an image data processing method.

Moreover, even in a case of processing image data for the same purpose, the number of pixel rows and pixel columns included in a pixel kernel may be predetermined depending on an image data processing method.

The number of pixel rows included in the pixel kernel may be less than or equal to the total number pixel rows corresponding to the image data stored in the line memory 111. Also, the number of pixel columns included in the pixel kernel may be less than or equal to the total number pixel columns corresponding to the image data stored in the line memory 111.

The number of pixel rows included in the pixel kernel may be equal to the number of pixel rows included in an image corresponding to the image data stored in the line memory 111. In other words, the number of pixel rows included in the pixel kernel may be p in number. The number of pixel columns included in the pixel kernel may be less than the number of pixel columns included in the image corresponding to the image data stored in the line memory 111. For example, the number of pixel columns included in the pixel kernel may be q (where n>=2, 1<=q<n) number.

The kernel memory 112 may include at least one or more registers. For example, the kernel memory 112 may include p*q number of registers. Each of the registers may store pixel data corresponding to each pixel included in the pixel kernel. The registers may separately operate.

The memory control unit 114 may allow the pixel kernel data obtained or sampled from the image to be stored in the line memory 111. The memory control unit 114 may transmit a signal to the line memory 111. The memory control unit 114 may perform control so that pieces of pixel kernel data, corresponding to the pixel kernel among pixel row data stored in the line memory 111, may be sampled or obtained from the line memory and transmitted to the kernel memory 112.

The vector data control unit 115 may convert the pixel kernel data, stored in the kernel memory 112, into vector data 116, and transmit the vector data 116 to the vector processor 120. The vector data 116 may correspond to a pixel vector including at least one or more pixels. The pixel vector may include at least one or more one-dimensionally arranged pixels.

The vector data control unit 115 may convert the pixel kernel, including rectangularly arranged pixels, into a pixel vector including one-dimensionally arranged pixels. For example, the vector data control unit 115 may traverse all pixels included in the pixel kernel. The vector data control unit 115 may rearrange the traversed pixels to generate the pixel vector. The vector data control unit 115 may transmit the vector data 116, corresponding to the generated pixel vector, to the vector processor 120.

The vector processor 120 may receive the vector data 116 from the vector data control unit 115, and process the vector data 116. The vector processor 120 may perform a vector processing operation by using the vector data 116. Referring to FIG. 4, the vector processor 120 may generate output vector data 116 as a result obtained by processing the received vector data 116. The vector processor 120 may transmit the output vector data 116 to the vector data control unit 115.

The vector data control unit 115 may receive the output vector data 116 from the vector processor 120, and convert the output vector data 116 into pixel kernel data. The vector data control unit 115 may store the pixel kernel data, obtained by converting the output vector data 116, in the kernel memory 112.

The memory control unit 114 may allow the pixel kernel data, stored in the kernel memory 112, to be transmitted to the line memory 111. The line memory 111 may receive the pixel kernel data from the kernel memory 112, and store the received pixel kernel data.

The image data control unit 113 may allow the image data, stored in the line memory 111, to be transmitted to the outside. The image data control unit 113 may allow pixel row data, stored in the line memory 111, to be transmitted to the external memory 500. The external memory 500 may receive and store the pixel row data.

The synchronizer 130 may synchronize an operation of the vector data manager 110 with an operation of the vector processor 120. The vector processor 120 may receive the vector data 116 from the vector data manager 110, and process the vector data 116. Tens of cycles or hundreds of cycles may be expended in processing the vector data 116. Therefore, the vector data manager 110 may wait until processing of the current vector data 116 is completed by the vector processor 120, without transmitting next vector data 116. Also, when the vector processor 120 completes processing the current vector data 116, the vector data manager 110 may immediately transmit the next vector data 116 to the vector processor 120.

Figure 5:
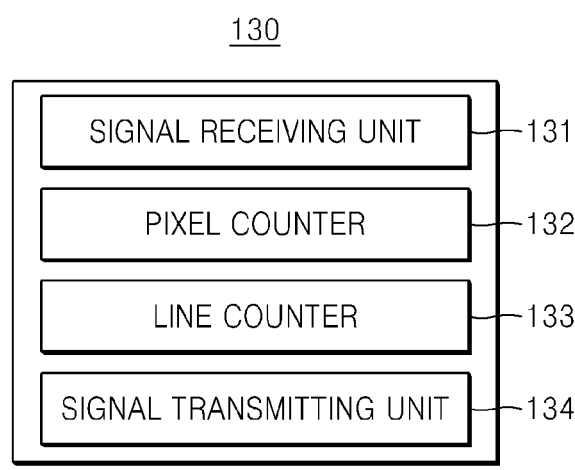
FIG. 5 is a block diagram of a configuration of a synchronizer of the image processing apparatus, according to an embodiment.

The synchronizer 130 may control a timing of when the vector data manager 110 transmits vector data 116 to the vector processor 120. FIG. 5 is a block diagram of a configuration of the synchronizer 130 of the image processing apparatus 100, according to an embodiment. Referring to FIG. 5, the synchronizer 130 may include a signal receiving unit 131, a pixel counter 132, a line counter 133, and a signal transmitting unit 134.

The signal receiving unit 131 may receive a signal, indicating a progress situation of processing of the vector data 116, from the vector processor 120. Also, the signal receiving unit 131 may receive a signal, indicating a start of the processing of the vector data 116, from the vector processor 120. Also, the signal receiving unit 131 may receive a signal, indicating a completion of the processing of the vector data 116, from the vector processor 120.

The pixel counter 132 may store a column index number of a pixel included in a pixel kernel corresponding to the vector data 116, which is being currently processed by the vector processor 20. The pixel counter 132, for example, may store a column index number of a pixel having the smallest column index number among a plurality of pixels included in the currently processed pixel kernel.

For example, it is assumed that the currently processed pixel kernel corresponds to an rth (where, 1<=r<=m−p+1) pixel row to a (r+p−1)th pixel row, and corresponds to an sth (where, 1<=s<=m−q+1) pixel column to a (s+q−1)th pixel column, in a whole image. The pixel counter 132 may store s "the smallest column index number".

The line counter 133 may store a row index number of a pixel included in the pixel kernel corresponding to the vector data 116 which is being currently processed by the vector processor 120. The pixel counter 133, for example, may store a row index number of a pixel having the smallest row index number among the plurality of pixels included in the currently processed pixel kernel.

For example, it is assumed that the currently processed pixel kernel corresponds to an rth (where, $1<=r<=m-p+1$) pixel row to a (r+p−1)th pixel row, and corresponds to an sth (where, $1<=s<=m-q+1$) pixel column to a (s+q−1)th pixel column, in a whole image. The pixel counter 132 may store r "the smallest row index number".

Therefore, the pixel counter 132 and the line counter 133 may store information about a position of the currently processed pixel kernel in the whole image. The pixel counter 132 or the line counter 133 may update the stored information according to a signal received by the signal receiving unit 131. That is, the information about the position of the currently processed pixel kernel in the whole image may be updated depending on the progress situation of the processing of the vector data 116.

The signal transmitting unit 134 may transmit a synchronization signal to the vector data manager 110 according to the signal received by the signal receiving unit 131. For example, when the signal indicating the completion of the processing of the vector data 116 is received by the signal receiving unit 131 from the vector processor 120, the signal transmitting unit 134 may transmit the synchronization signal to the vector data control unit 115 of the vector data manager 110.

In response to the synchronization signal, the vector data control unit 115 may convert the pixel kernel data, stored in the kernel memory 112, into the vector data 116, and transmit the vector data 116 to the vector processor 120. Therefore, the synchronizer 130 may control a timing of when the vector data manager 110 transmits the vector data 116 to the vector processor 120.

Moreover, the vector data control unit 115 may transmit the synchronization signal to the memory control unit 114. The memory control unit 114 may allow new pixel kernel data to be stored in the kernel memory 112 in response to the synchronization signal. That is, in response to the synchronization signal, the pixel kernel data stored in the kernel memory 112 may be transmitted to the vector processor 120, and then may be updated with the new pixel kernel data.

The new kernel pixel data may correspond to a newly defined pixel kernel. The new pixel kernel may be defined according to a predetermined rule. For example, a column index number of each pixel column included in the new pixel kernel may be one greater than a column index number of each pixel column included in a previous pixel kernel. Also, a row index number of each pixel row included in the new pixel kernel may be the same as a row index number of each pixel row included in the previous pixel kernel.

According to another embodiment, a column index number of each pixel column included in the new pixel kernel may be greater than a column index number of each pixel column (included in the previous pixel kernel) by the number of pixel columns included in a pixel kernel. Also, a row index number of each pixel row included in the new pixel kernel may be the same as a row index number of each pixel row included in the previous pixel kernel. That is, the new pixel kernel may be defined by a stride access scheme.

A method of defining a new pixel kernel may be predetermined depending on an image data processing method.

For example, when the increased column index number is greater than the maximum column index number in the whole image, a column index number of each pixel column included in the new pixel kernel may be numbered from or reset to 1. Also, a row index number of each pixel row included in the new pixel kernel may be one greater than a row index number of each pixel row included in the previous pixel kernel.

For example, when the column index number has reached the maximum the increased row index number is greater than the maximum row index number in the whole image, this is a case in which all image data has been processed (the end of processing). In this case, therefore, a new pixel kernel may not be defined.

For example, it is assumed that a current pixel kernel corresponding to the vector data 116, which is being currently processed by the vector processor 20, may correspond to the rth (where, $1<=r<=m-p+1$) pixel row to the (r+p−1)th pixel row, and correspond to the sth (where, $1<=s<=m-q+1$) pixel column to the (s+q−1)th pixel column, in the whole image. The pixel counter 132 of the synchronizer 130 may store s. Also, the pixel counter 133 of the synchronizer 130 may store r. When a signal indicating a completion of processing of vector data 116 corresponding to the pixel kernel is received from the vector processor 120, the synchronizer 130 may transmit the synchronization signal to the vector data manager 110.

When the vector data 116 corresponding to the current pixel kernel is being processed by the vector processor 120, the kernel memory 112 may pre-store pixel kernel data corresponding to a next pixel kernel. The next pixel kernel may correspond to the rth pixel row to the (r+p−1)th pixel row, and correspond to an (s+1)th pixel column to an (s+q)th pixel column, in the whole image.

For example, when the next pixel kernel is defined by the stride access scheme, the next pixel kernel may correspond to the rth pixel row to the (r+p−1)th pixel row, and correspond to the (s+q)th pixel column to a (s+2q−1)th pixel column, in the whole image. Hereinafter, a case in which a pixel kernel is defined by the stride access scheme is not described.

For example, when s+q is greater than n, the next pixel kernel may correspond to a (r+1)th pixel row to a (r+p)th pixel row, and correspond to a first pixel column to a (1+q−1)th pixel column, in the whole image. For example, when r+p is greater than m, this is a case in which all the image data has been processed, and the next pixel kernel may not be there. Hereinafter, it is assumed that the next pixel kernel may correspond to the rth pixel row to the (r+p−1)th pixel row, and correspond to an (s+1)th pixel column to the (s+q)th pixel column, in the whole image.

In response to the synchronization signal, the vector data control unit 115 may convert pixel kernel data corresponding to next pixel kernel into vector data 116, and transmit the vector data 116 to the vector processor 120. The vector processor 120 may start to process the vector data 116 corresponding to the next pixel kernel. The pixel counter 132 of the synchronizer 130 may store s+1. Also, the pixel counter 133 of the synchronizer 130 may store r.

The memory control unit 114 may allow pixel kernel data, corresponding to a pixel kernel subsequent to the next pixel kernel, to be stored in the kernel memory 112 in response to the synchronization signal. The memory control unit 114 may perform control so that the pixel kernel data, corresponding to the pixel kernel subsequent to the next pixel kernel among all image data stored in the line memory 111, is transmitted to the kernel memory 112.

The pixel kernel subsequent to the next pixel kernel may correspond to the rth pixel row to the (r+p−1)th pixel row, and correspond to an (s+2)th pixel column to the (s+q+1)th pixel column, in the whole image. For example, when s+q+1 is greater than n, the pixel kernel subsequent to the next pixel kernel may correspond to the (r+1)th pixel row to the (r+p)th pixel row, and correspond to the first pixel column to the (1+q−1)th pixel column, in the whole image. For example, when r+p is greater than m, this is a case in which all the image data has been processed, and the pixel kernel subsequent to the next pixel kernel may not be there. Hereinafter, it is assumed that pixel kernel subsequent to the next pixel kernel may or exist correspond to the rth pixel row to the (r+p−1)th pixel row, and correspond to the (s+2)th pixel column to the (s+q+1)th pixel column, in the whole image.

Moreover, the memory control unit 114 may transmit the synchronization signal to the image data control unit 113. In response to the synchronization signal, the image data control unit 113 may allow the image data, stored in the external memory 500, to be transmitted to the line memory 111.

For example, when a column index number of a pixel having the greatest column index number among pixels included in the pixel kernel subsequent to the next pixel kernel is the same as the maximum column index number in the whole image, new pixel row data may be transmitted to the line memory 111. That is, it is assumed that kernel pixel data stored in the kernel memory 112 corresponds to the rth pixel row to the (r+p−1)th pixel row, and corresponds to an (n−q+1)th pixel column to the nth pixel column, in the whole image. In this case, the image data control unit 113 may allow new pixel row data to be transmitted to the line memory 111.

For example, pixel row data (which is pre-stored in the line memory 111) corresponding to the rth pixel row to the (r+p−1)th pixel row may be updated. The image data control unit 113 may allow pixel row data, corresponding to the (r+p)th pixel row, to be transmitted from the external memory 500 to the line memory 111. The line memory 111 may discard pixel row data corresponding to the rth pixel row, and store pixel row data corresponding to the (r+1)th pixel row to the (r+p)th pixel row. Therefore, image data, which is to be subsequently transmitted from the line memory 111 to the kernel memory 112, may be pre-stored in the line memory 111.

For example, when the (r+p−1)th pixel row corresponds to the last pixel row in the whole image, this is a case in which all the image data has been processed, and new pixel row data may not be transmitted to the line memory 111. That is, when pixel row data pre-stored in the line memory 111 corresponds to an (m−p+1)th pixel row to an mth pixel row in the whole image, new pixel row data may not be transmitted to the line memory 111.

For example, when a column index number of a pixel having the greatest column index number among the pixels included in the pixel kernel subsequent to the next pixel kernel is less than the maximum column index number in the whole image, the pixel row data pre-stored in the line memory 111 may be maintained. That is, when image data, which is to be subsequently transmitted from the line memory 111 to the kernel memory, 112 remains in the line memory 111, image data stored in the line memory 111 may be maintained.

Moreover, the vector data control unit 115 may receive output vector data 116 from the vector processor 120 in response to the synchronization signal received from the synchronizer 130. Also, the vector data control unit 115 may convert the output vector data 116 into pixel kernel data, and store the pixel kernel data in the kernel memory 112. Therefore, the synchronizer 130 may control a timing of when the vector data manager 110 receives the output vector data 116 from the vector processor 120.

The vector processor 120 may process pixel kernel data corresponding to a pixel kernel to generate the output vector data 116. Therefore, the output vector data 116 may correspond to the pixel kernel. For example, it is assumed that the pixel kernel corresponds to the rth pixel row to the (r+p−1)th pixel row, and corresponds to the sth pixel column to the (s+q−1)th pixel column, in the whole image.

The memory control unit 114 may allow pixel kernel data, stored in the kernel memory 112 to be transmitted to the line memory 111 in response to the synchronization signal. The line memory 111 may store the pixel kernel data in a part corresponding to the pixel kernel among a plurality of parts of the line memory 111. That is, the line memory 111 may store the pixel kernel data in a part corresponding to the sth pixel column to the (s+q−1)th pixel column.

In response to the synchronization signal, the image data control unit 113 may allow image data, stored in the line memory 111, to be transmitted to the external memory 500. Therefore, the synchronizer 130 may control a timing of when the vector data manager 110 transmits the image data to the external memory 500.

For example, when a column index number of a pixel having the greatest column index number among pixels included in the pixel kernel is the same as the maximum column index number in the whole image, the image data control unit 113 may allow all image data, stored in the line memory 111, to be transmitted to the external memory 500. That is, when a value of s+q−1 is the same as a value of n, the image data control unit 113 may allow all the image data, stored in the line memory 111, to be transmitted to the external memory 500.

For example, when a column index number of a pixel having the greatest column index number among the pixels included in the pixel kernel is less than the maximum column index number in the whole image, the image data control unit 113 may disallow the image data, stored in the line memory 111, to be transmitted to the external memory 500. That is, when the value of s+q−1 is less than the value of n, the image data stored in the line memory 111 may not be transmitted to the external memory 500.

According to the embodiment, a vector processing operation using image data may be continuously performed by using only a small number of accesses to the external memory 500. Therefore, a throughput of the image processing apparatus 100 is enhanced, and massive image data is processed in real time.

Figure 6:
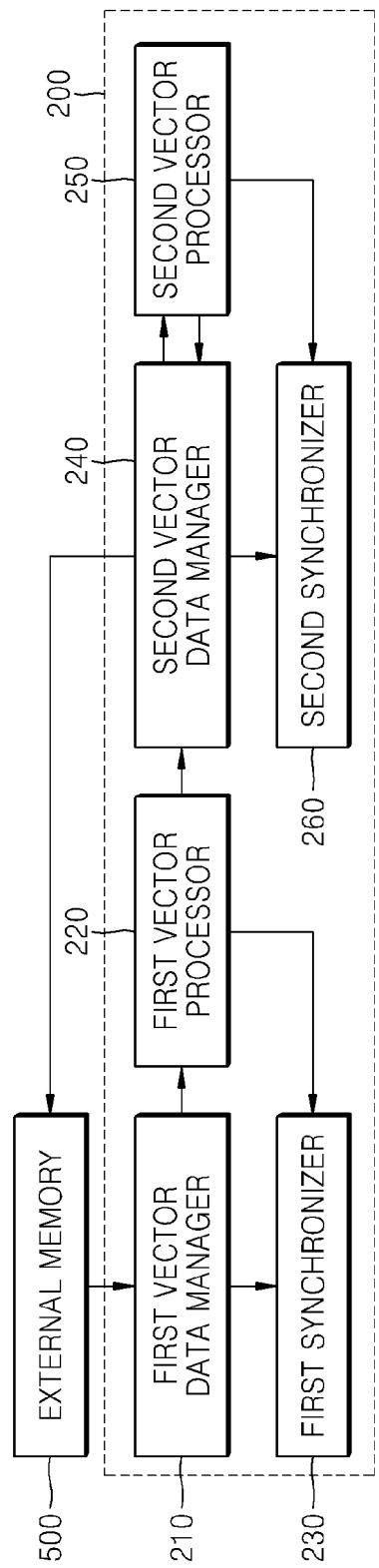
FIG. 6 is a block diagram of a configuration of an image processing apparatus according to another embodiment.

FIG. 6 is a block diagram of a configuration of an image processing apparatus 200 according to another embodiment. Referring to FIG. 6, the image processing apparatus 200 according to another embodiment may include a first vector data manager 210, a first vector processor 220, a first synchronizer 230, a second vector data manager 240, a second vector processor 250, and a second synchronizer 260.

The first vector data manager 210 may receive at least some of first image data from the external memory 500. The first vector data manager 110 may convert the received first image data into vector data.

The first vector processor 220 may receive the vector data from the first vector data manager 210, and process the received vector data. The first vector processor 220 may generate first output vector data as a result obtained by processing the vector data. The first vector processor 220 may transmit the first output vector data to the second vector data manager 240.

The first synchronizer 230 may synchronize an operation of the first vector data manager 210 with an operation of the first vector processor 220. The first synchronizer 230 may control a timing of when the first vector data manager 210 transmits vector data to the first vector processor 220.

The second vector data manager 240 may receive the first output vector data from the first vector processor 220. The second vector processor 250 may receive the first output vector data from the second vector data manager 240, and process the received first output vector data. The second vector processor 250 may generate second output vector data as a result obtained by processing the first output vector data. The second vector processor 250 may transmit the second output vector data to the second vector data manager 240. The second vector data manager 240 may convert the second output vector data into second image data. The second vector data manager 240 may transmit the second image data to the external memory 500.

The second synchronizer 260 may synchronize an operation of the second vector data manager 240 with an operation of the second vector processor 250. The second synchronizer 260 may control a timing of when the second vector data manager 240 receives the first output vector data from the first vector processor 220. Also, the second synchronizer 260 may control a timing of when the second vector data manager 240 transmits the first output vector data to the second vector processor 250. Also, the second synchronizer 260 may control a timing of when the second vector data manager 240 receives the second output vector data from the second vector processor 250. Also, the second synchronizer 260 may control a timing of when the second vector data manager 240 transmits the second output vector data to the external memory 500.

According to another embodiment, unlike in FIG. 6, the image processing apparatus 200 may include three or more vector data managers 110, three or more vector processors 120, and three or more synchronizers 130. According to another embodiment, similarly to the embodiment of FIG. 6, the external memory 500 may be connected to the vector data manager 110, the vector processor 120, and the synchronizer 130.

Unlike the above-described image processing apparatus 100, the image processing apparatus 200 according to the present embodiment may include a plurality of vector processors 120. Also, the plurality of vector processors 120 may be connected in series. That is, the plurality of vector processors 120 may be connected in the form of pipelines. Therefore, an image processing chain may be configured. In the image processing chain, vector data may be obtained through processing by one vector processor 120, and another vector processor 120 may receive and process the vector data.

Therefore, a plurality of image processing operations may be simultaneously and continuously performed. Also, the plurality of image processing operations may be performed in parallel. Accordingly, a throughput of the image processing apparatus 200 is enhanced, and massive image data is processed in real time.

Figure 7:
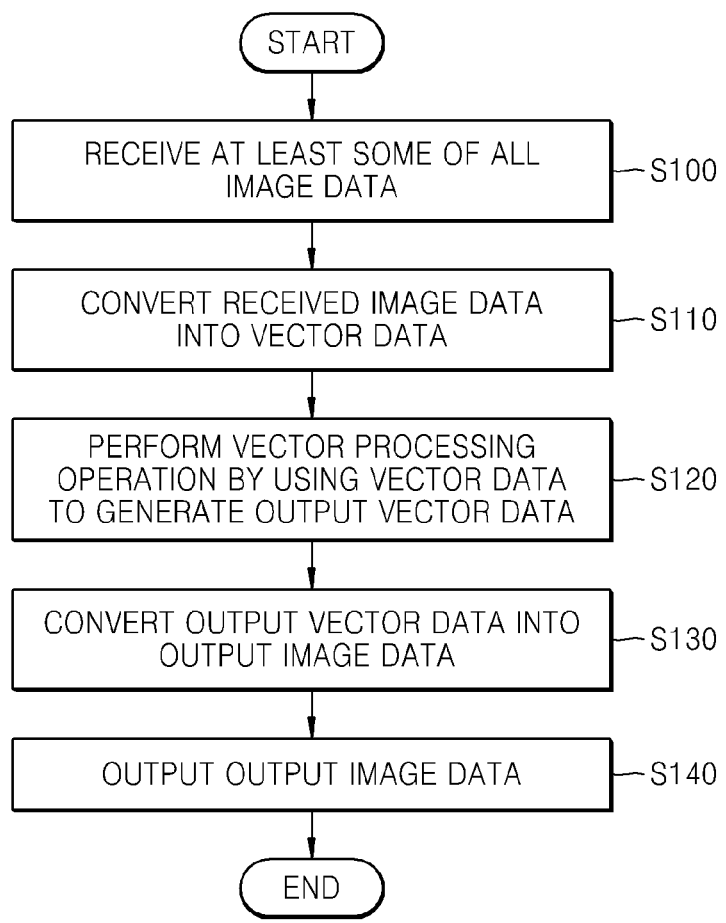
FIG. 7 is a flowchart of an image processing method according to an embodiment.

FIG. 7 is a flowchart of an image processing method according to an embodiment. Referring to FIG. 7, in the image processing method according to the present embodiment, operation S100 of receiving at least some of all image data may be first performed. The vector data manager 110 may receive the at least some of all image data from the external memory 500.

Subsequently, operation S110 of converting the received image data into vector data may be performed. The image data control unit 113 of the vector data manager 110 may perform control so that pieces of pixel row data corresponding to at least one or more continuous pixel rows among all the image data are stored in the line memory 111. Also, the memory control unit 114 may perform control so that pixel kernel data corresponding to a pixel kernel among the pixel row data is stored in the kernel memory 112.

The vector data control unit 115 may convert the pixel kernel data into vector data in response to the synchronization signal from the synchronizer 130. The vector data may be transmitted to the vector processor 120.

Subsequently, operation S120 of performing a vector processing operation by using the vector data to generate output vector data may be performed. The vector processor 120 may receive and process the vector data. The vector processor 120 may generate the output vector data as the processing result.

Subsequently, operation S130 of converting the output vector data into output image data may be performed. The vector data control unit 115 may receive the output vector data from the vector processor 120. The vector data control unit 115 may convert the output vector data into pixel kernel data. The vector data control unit 115 may store the pixel kernel data in the kernel memory 112. Also, the memory control unit 114 may allow the pixel kernel data to be transmitted to the line memory 111.

Subsequently, operation S140 of outputting the output image data may be performed. The image data control unit 113 may allow pixel row data, stored in the line memory 111, to be transmitted to the external memory 500.

The line memory 111 and kernel memory 112 are two-dimensional structures. The kernel data has been described as being converted into a one-dimensional vector and the vector processor 120 has been described as processing a one-dimensional vector. It is of course within the scope of the embodiments discussed herein for the vector to be a two-dimensional vector and for the vector processor 120 to be a two-dimensional vector processor.

As described above, according to the one or more of the above embodiments, image data is more efficiently processed.

Moreover, image data is more quickly processed.

Moreover, massive image data is processed in real time.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image processing apparatus, comprising:
   a vector data manager configured to receive at least some of all image data as received image data, and converts the received image data into first vector data and transmits the first vector data;
   a vector processor configured to receive the first vector data from the vector data manager, performs a vector processing operation by using the first vector data, and generates output vector data as a result of the vector processing operation; and a synchronizer, by at least one processor, configured to control a transmit timing of when the vector data manager transmits the first vector data to the vector processor, wherein the vector data manager comprises:

a line memory that receives and stores first pixel row data corresponding to at least one or more continuous pixel rows among all the image data;

a kernel memory that receives first pixel kernel data, corresponding to a first pixel kernel including two-dimensionally arranged at least one or more continuous pixels among the first pixel row data, from the line memory, and stores the received first pixel kernel data; and a vector data controller, by at least one processor, configured to convert the first pixel kernel data, stored in the kernel memory, into the first vector data, and transmits the first vector data to the vector processor.

2. The image processing apparatus of claim 1, wherein the vector data manager receives the output vector data from the vector processor, converts the output vector data into output image data, and outputs the output image data.

3. The image processing apparatus of claim 2, wherein the synchronizer controls a receipt timing of when the vector data manager receives the output vector data from the vector processor, and controls an output timing of when the vector data manager outputs the output image data.

4. The image processing apparatus of claim 1, wherein the synchronizer comprises:

a signal receiver configured to receive a progress signal, by the at least one processor, indicating a progress situation of the vector processing operation from the vector processor; and a signal transmitter, by the at least one processor, configured to transmit a synchronization signal to the vector data manager according to the received progress signal, wherein:

the vector data controller, by the at least one processor, transmits the first vector data to the vector processor in response to the synchronization signal, and the first pixel kernel data stored in the kernel memory is updated with second pixel kernel data corresponding to a second pixel kernel in response to the synchronization signal.

5. The image processing apparatus of claim 4, wherein when a column index number of a pixel having a greatest column index number among a plurality of pixels included in the second pixel kernel is a same as a maximum column index number in a whole image corresponding to all the image data, the first pixel row data stored in the line memory is updated with second pixel row data in response to the synchronization signal.

6. The image processing apparatus of claim 4, wherein:

a column index number of a pixel column included in the second pixel kernel is greater than the column index number of the pixel column included in the first pixel kernel, and a row index number of a pixel row included in the second pixel kernel is a same as the row index number of the pixel row included in the first pixel kernel.

7. The image processing apparatus of claim 1, wherein the vector data manager further comprises:

an image data controller configured to perform control, by the at least one processor, where the first pixel row data among all the image data stored in an external memory is stored in the line memory; and a memory controller configured to allow the pixel kernel data to be stored in the kernel memory.

8. The image processing apparatus of claim 1, wherein:

a number of pixel rows corresponding to the first pixel row data is less than the number of pixel rows included in a whole image corresponding to all the image data, and a number of pixels included in each of the pixel rows is a same as a number of pixel columns included in a whole image.

9. The image processing apparatus of claim 1, wherein, a number of pixel rows included in the pixel kernel is a same as the number of pixel rows corresponding to the first pixel row data stored in the line memory, and a number of pixel columns included in the pixel kernel is less than the number of pixel columns included in a whole image corresponding to all the image data.

10. The image processing apparatus of claim 1, wherein the vector data corresponds to a pixel vector including at least one or more one-dimensionally arranged pixels.

11. An image processing apparatus, comprising:

a first vector data manager configured to receive at least some of first image data as received first image data, and converts the received first image data into first vector data and transmits the first vector data;

a first vector processor configured to receive the first vector data from the first vector data manager, performs a first vector processing operation by using the first vector data, and generates first output vector data as a result of the first vector processing operation;

a first synchronizer configured to control a timing, by at least one processor, of when the first vector data manager transmits the first vector data to the first vector processor;

a second vector data manager configured to receive the first output vector data from the first vector processor;

a second vector processor configured to receive the first output vector data from the second vector data manager, performs a second vector processing operation by using the first output vector data, and generates second output vector data as a result of the second vector processing operation; and a second synchronizer configured to control a timing, by the at least one processor, of when the second vector data manager receives the first output vector data from the first vector processor and a timing of when the second vector data manager transmits the first output vector data to the second vector processor, wherein the first vector data manager comprises:

a first line memory that receives and stores first pixel row data corresponding to at least one or more continuous pixel rows among all the image data;

a first kernel memory that receives first pixel kernel data, corresponding to a first pixel kernel including two-dimensionally arranged at least one or more continuous pixels among the first pixel row data, from the line memory, and stores the received first pixel kernel data; and a first vector data controller, by at least one processor, configured to convert the first pixel kernel data, stored in the first kernel memory, into the first vector data, and transmits the first vector data to the first vector processor.

12. The image processing apparatus of claim 11, wherein:
the second vector data manager receives the second output vector data from the second vector processor, converts the second output vector data into second image data, and outputs the second image data, and
the second synchronizer controls a timing of when the second vector data manager receives the second output vector data from the second vector processor and a timing of when the second vector data manager outputs the second image data.

13. An image processing method, comprising:
receiving first pixel row data corresponding to at least one or more continuous pixel rows among all image data;
storing the first pixel row data in a line memory;
receiving the first pixel kernel data, corresponding to a first pixel kernel including two-dimensionally arranged at least one or more continuous pixels among the first pixel row data, from the line memory;
storing the received first pixel kernel data in a kernel memory;
converting the first pixel kernel data, stored in the kernel memory, into vector data in response to a synchronization signal; and
performing a vector processing operation by using the vector data to generate output vector data.

14. The image processing method of claim 13, further comprising:
after the generating of the output vector data,
converting the output vector data into output image data; and
outputting the output image data.

* * * * *